Patented Oct. 20, 1925.

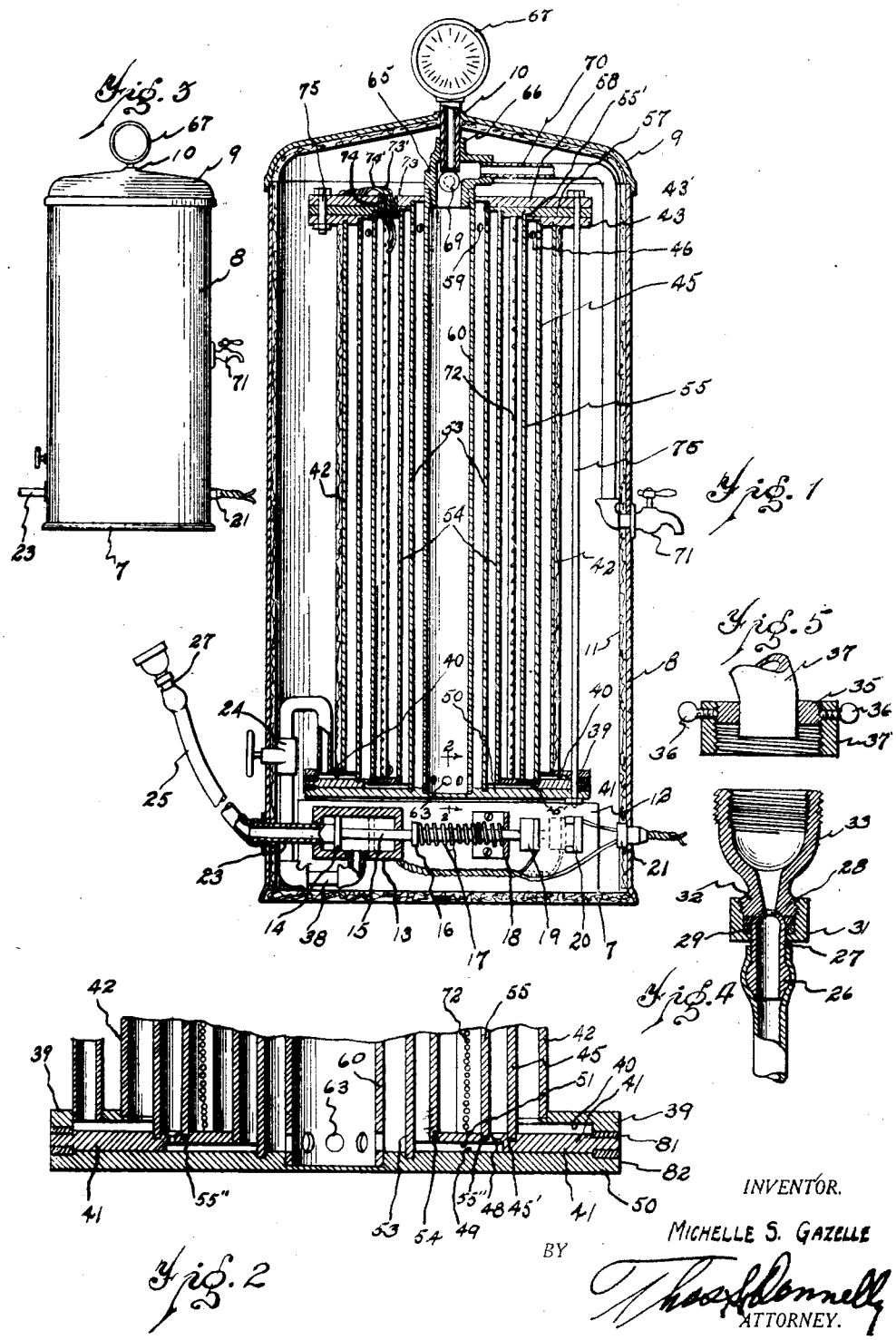

1,557,682

UNITED STATES PATENT OFFICE.

MICHELLE S. GAZELLE, OF HIGHLAND PARK, MICHIGAN.

ELECTRIC HEATER.

Application filed April 10, 1925. Serial No. 22,073.

*To all whom it may concern:*

Be it known that I, MICHELLE S. GAZELLE, a subject of the King of England (who has declared his intention of becoming a citizen of the United States), residing at Highland Park, in the county of Wayne and State of Michigan, have invented a new and useful Improvement in an Electric Heater, of which the following is a specification.

My invention relates to a new and useful improvement in an electric instantaneous heater, and has for its object, the provision of a water heater of this class which will be durable in structure, economical of manufacture and highly efficient in use.

Another object of the invention is the provision of a water heater of this class, which will be compact and afford a maximum of heating service for the flowing water.

Another object of the invention is the provision of a water heater of this class in which the flowing water is directed through various passages, so arranged that the cooler water is heated to some extent by the water which has been raised to a higher temperature on account of the close relation of the various passages in which the water flows.

Another object of the present invention is the provision of an electric water heater having control means, automatically operated upon the turning on of the water, so that the heating of the water begins immediately with the flowing of the water through the heater.

Another object of the invention is the provision of a water heater of this class, made from a plurality of tubes mounted in separate rings, so that the device may be quickly and easily taken apart for cleaning or repairing, the various parts being of a standard size and adapted for mounting in co-operative relation.

Other objects will appear hereinafter.

The invention consists in the combination and arrangement of parts hereinafter described and claimed.

The invention will be best understood from a reference to the accompanying drawings which form a part of this specification and in which, Fig. 1 is a central, vertical, sectional view of the invention.

Fig. 2 is a fragmentary, enlarged, sectional view of the invention.

Fig. 3 is a side elevational view of the invention.

Fig. 4 is a longitudinal central sectional view of the faucet attaching means.

Fig. 5 is a central sectional view of a modified form of attaching means.

The invention, as shown in the drawings, comprises an outer casing having a base 7, mounted upon which is a housing 8 having a cover 9 attached thereto and provided with a centrally disposed opening having a flanged neck 10. The housing is insulated with a layer of asbestos 11. Mounted in the housing, which is preferably of cylindrical form, extending diametrically thereof is a supporting wall 12, upon which is mounted a cylinder forming housing 13, in which is slidably positioned a piston head 14 fixedly mounted upon the piston rod or stem 15. A collar 16 is mounted on the stem 15, exterior of the housing 13. Positioned upon the stem 15 in embracing relation, so as to engage, at one end, the collar 16, is a spiral spring 17, the other end of which engages the angle block 18 through which the rod 15 is projected. The rod 15 carries, at its outer end, a contact 19 adapted, upon movement sufficiently in one direction, to close the knife blade switch 20, which is electrically connected to the socket plug 21 adapted for receiving the plug 22, which is connected to a suitable source of electrical energy. One of the contacts of the knife switch 20 is connected to the socket plug 21, and the other contact is connected to an electric heating element described later. An inlet pipe 23 communicates with the interior of the cylinder forming housing 13. The pipe 23 is adapted for connection with a supply of water, such as, the ordinary city supply, by means of a pipe, or hose, 25. The hose 25 is connected to a nipple 27, which has an enlargement 26 formed thereon, adjacent one end. The other end of the nipple 27 is restricted, as at 28, and is provided with a peripheral flange 30. A packing nut 31 is adapted for threading on the neck 32 of the globe-shaped attachment 33, which is threaded exteriorly and interiorly, at its upper end. Packing 29 is positioned between the base of the packing nut 31 and the flange 30, so as to secure a water tight swivel connection. If the faucet to which the pipe 25 is to be connected is exteriorly threaded, the globe-shaped member 33 may be threaded to the faucet using the interior threads. When, however, the faucet is not threaded, as shown by 37, a rubber plug 35 is used for embracing the faucet 37 and the annular interiorly threaded member 34 may be threaded upon the exterior threads of the globe-shaped member 33. Set screws 36 projected through the member 34 will serve to press the rubber ring or plug 35 into close engagement with the faucet 37, to provide a water-tight connection. When the connection is made to the faucet and the water turned through the pipe 23 into the cylinder-forming housing 13, the piston head 14 causes the rod 15 to move, so as to close the knife blade switch 20 through the contact 19. The water then will flow through the pipe 38, which is connected to suitable piping, and threaded into an opening formed in the ring 39, a control valve 24 being interposed in the pipe 38. These rings are preferably made from metal, as are also the various tubes used. The ring 39 is positioned upon a ring 41, and has a cut-away portion 40 to provide a passage for the water flowing through the pipe 38. Mounted at one end in the ring 39 in a press fit is a tube 42, the cut-away portion 40 serving to conduct the water into the interior of the tube 42. Pressed into a recess 45' formed in the ring 41, in a press fit, is one end of a tube 45, which is provided, at its upper end, on its circumference, with a plurality of openings 46, so that the water flowing upwardly within the tube 42 is permitted to pass through the openings 46 into the interior of the tube 45.

The upper end of the tube 42 is pressed into a recess 45' formed in the ring 43, and the upper end of the tube 45 is pressed into a cut-away portion of the ring 43, the connections of these various tubes with the rings in which they are pressed being a water-tight connection. The water flowing downwardly within the tube 45 is then permitted to pass through an opening 48 formed in a ring 41. The opening 48 is in communication with a passage 49 formed with the ring 50 and the ring 41, which has a cut-away portion 51 to permit the passage of the water, so as to flow upwardly, interiorly of the tube 54 and exteriorly of the tube 53. The tube 54 is pressed into the ring 41 and the tube 53 is pressed into a recess formed in the ring 50 at the lower ends of said tubes. The upper end of the tube 54 is pressed into a cut-away portion of the ring 57 and the upper end of the tube 53 is pressed into a cut-away portion of the ring 58 and the ring 57. The upper end of the tube 53 is provided with a plurality of openings 59 which permit the passage of the water into the interior of the tube 53, so as to permit its flowing downwardly exteriorly of the tube 60, the tube 60 being pressed into the ring 58 at its upper end and projecting beyond the same. The lower end of the tube 60 is pressed into a recess formed in the ring 50, the tube 60 being provided, at its lower end, with a plurality of openings 63, to permit the passage of the water which is exterior of the tube 60 to the interior thereof. The upper end of the tube 60 is interiorly threaded for the reception of a T 65. Mounted in one end of the T 65 is a tube 66 which supports a housing 67 having a face dial mounted thereon. Supported in the tube 66 and extending into the housing 67 is a thermometer 69 for indicating the temperature of the water in the T 65. An outlet pipe 70 is connected to the T and serves to conduct the water from the interior of the tube 60 to the faucet 71. The tube 55 is positioned at its upper end in a recess 55' formed in the ring 57 and at its lower end is a recess 55'' formed in the ring 41. Positioned in the various recesses of these rings may be a gasket as 55''. Positioned between the tubes 54 and 55 is a porcelain core 72 which carries a heating element electrically connected to the plug 21 and the switch 20. Suitable insulating plugs 73 and 74 are projected through the upper rings for permitting a passage of the wires 73' and 74' therethrough. If desired, the heating element, which is wound upon the core 72, may be covered with mica, so as to insulate this heating element from the tube 55, although as shown in the drawings, this tube 55 is spaced considerable from the heating element which is wound on the core 72. In operation, when the water is turned on and the valve 24 opened, the switch is closed and the heating element energized. The water then passes upwardly, between the tubes 42 and 45; then downwardly, between the tubes 45 and 55; thence, upwardly between the tubes 53 and 54; thence downwardly, between the tubes 53 and 60; and thence upwardly to the interior of the tube 60 to the outlet pipe 70. The water traveling downwardly between the tubes 55 and 45 will receive considerable heat from the heating element, so that the water passing upwardly between the tubes 42 and 45, will be somewhat heated on account of the heat conducted by the tube 45 from the water between the tubes 45 and 55. Similarly, the water traveling downwardly, between the tubes 60 and 53, will be heated by conduction from the water traveling upwardly between the tubes 53 and 54.

With a heater of this class, there is provided an instantaneous heater in which the water may be heated while it is flowing and the heater may also be used as a heater for heating stationary water, inasmuch as when the faucet 71 is closed, the water will continue to be heated, so long as the pressure is exerted upon the piston head. If sufficient ly to retain the contact between the member 19 and the knife blade switch 20.

The plates are joined together at the bottom and the top by suitable bolts 75, the pairs of plates at opposite ends of the tubes being held together by rods 76. If it is desired to disassemble the invention for cleaning the various tubes, the pipe 23 may be unscrewed from connection with the housing 13, the cover 9 removed, and the various tubes disconnected upon disconnecting the plates connected thereto. If desired the rings may be provided with gaskets 81 and 82 to form a tighter connection than would be the case were the metal to be pushed together, without gaskets.

While I have illustrated and described the preferred form of structure, I do not wish to limit myself to the precise form of structure shown, but desire to avail myself of such variations and modifications as come with in the scope of the appended claims.

Having thus described my invention, what I claim as new and desire to secure by Letters Patent is:

1. An electrical heater of the class described, comprising a plurality of tubes; a pair of rings adapted for mounting on each of said tubes, one of said rings being mounted at each end of each of said tubes in embracing relation, the passages between the adjacent tubes being in connection at alternate ends; means for conducting water into said passages; and outlet means for conducting water from said passages; and an electrical heating element adapted for heating the water while passing through said passages.

2. In an electrical heating device of the class described, a casing; a plurality of tubes mounted in said housing in embracing and spaced relation to each other; a plurality of rings, one of said rings being adapted for mounting on each end of each of said tubes, the central tube being threaded, at its upper end; means for conducting water from the interior of said central tube to the exterior of said housing.

In testimony whereof, I have signed the foregoing specification.

MICHELLE S. GAZELLE.